Nov. 1, 1960     J. A. HARDY     2,958,124
APPARATUS FOR ASSEMBLING RUBBER BUSHINGS
Original Filed March 26, 1951     2 Sheets-Sheet 1
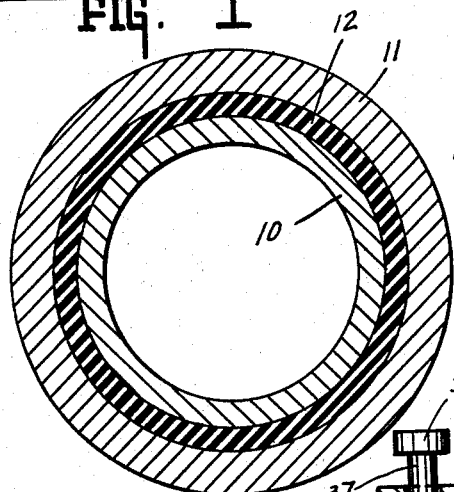
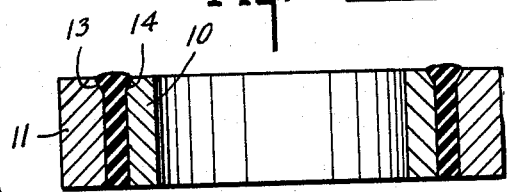
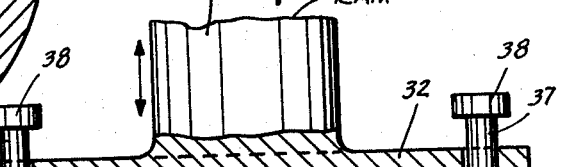
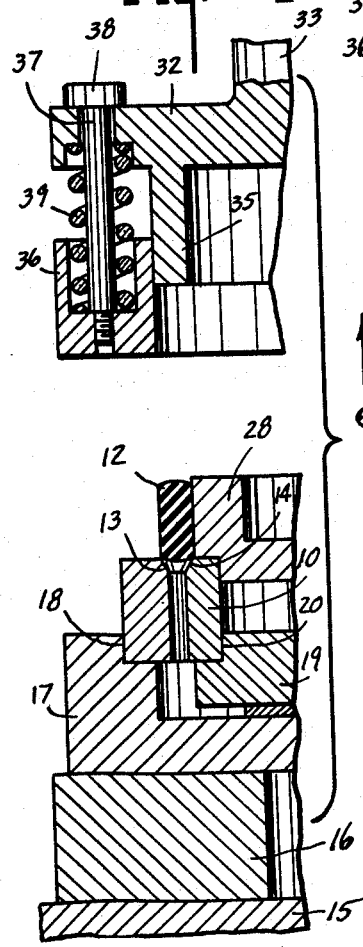
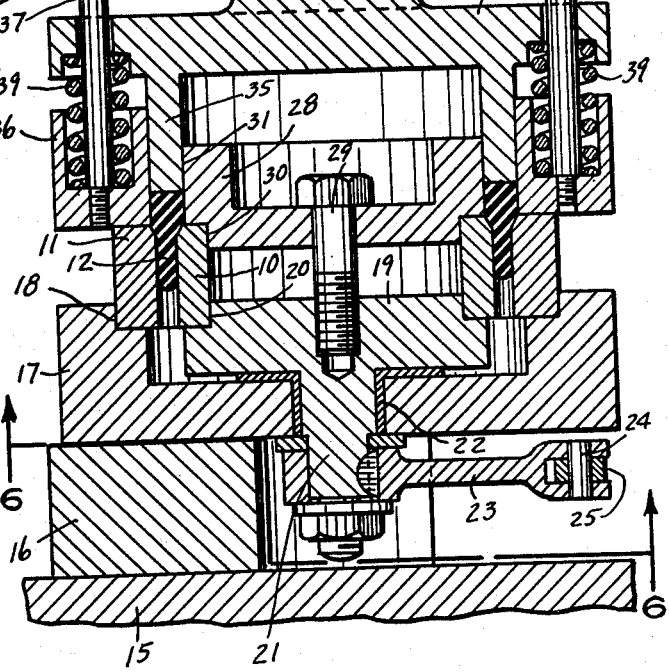
INVENTOR.
JAMES A. HARDY
BY
*Lockwood, Galt, Woodard & Smith*
ATTORNEYS.

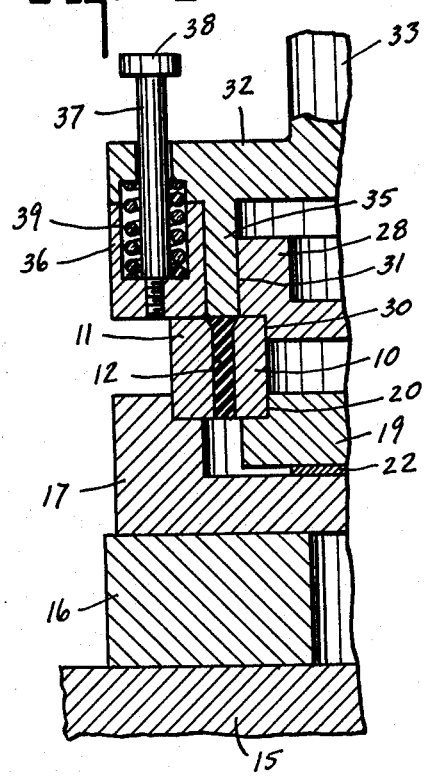
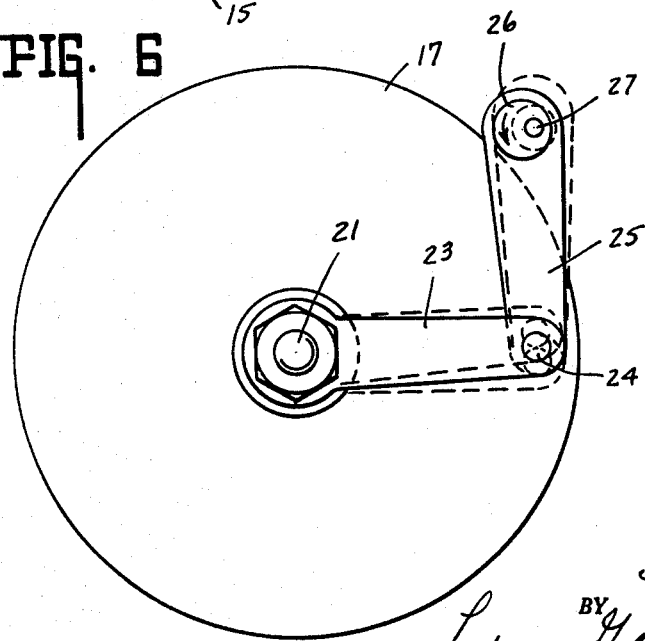

United States Patent Office 2,958,124
Patented Nov. 1, 1960

2,958,124

APPARATUS FOR ASSEMBLING RUBBER BUSHINGS

James A. Hardy, Indianapolis, Ind., assignor to Schwitzer Corporation, Indianapolis, Ind., a corporation Original application Mar. 26, 1951, Ser. No. 217,561. Divided and this application Feb. 20, 1956, Ser. No. 566,508

3 Claims. (Cl. 29—235)

This invention relates to an apparatus for assembling bushings made of rubber or similar materials in a compressed state between two cylindrical surfaces, insuring that the cylindrical surfaces will remain essentially parallel and concentric after assembly, this application being a division of application Serial No. 217,561, filed March 26, 1951 entitled Method and Apparatus For Assembling Rubber Bushings. This is accomplished by use of the apparatus hereinafter more specifically set forth and described by mounting the spaced concentric rings or sleeves between which the bushing is to be placed, in a fixture, applying lubricant to the surfaces thereof, and thereupon simultaneously exerting axial force against the bushing to force it between the sleeves or rings while oscillating one of the sleeves or rings relative to the other. Such simultaneous force and oscillation causes a slippage between the elastic bushing and the confining surfaces of the sleeves or rings. Such slippage permits the bushing to set into place and relieves stresses therein such as would otherwise cause the sleeves or rings to be eccentric with respect to each other after completion of the assembly.

It further results in an even flow of the elastic body of the bushing such that its compression and tension is evenly distributed throughout, free of localized stress or strain.

The full nature of the invention will be understood from the accompanying drawings and the following description and claims:

Fig. 1 is an end view showing a pair of spaced concentric sleeves with an elastic bushing assembled therebetween.

Fig. 2 is a central vertical section through the assembly shown in Fig. 1.

Fig. 3 is a central vertical section through the apparatus employed in practicing the method of inserting an elastic bushing between spaced concentric rings with the bushing partially inserted.

Fig. 4 is a view similar to Fig. 3 with portions thereof broken away, illustrative of the position of the parts at the beginning of the assembly operation.

Fig. 5 is the same as Fig. 4 showing the position of the parts at the completion of the assembly operation.

Fig. 6 is a plan view of the underside of the apparatus viewed from the line 6—6 of Fig. 3, showing the oscillating mechanism.

In the drawings there is shown for illustration an inner sleeve or ring 10 and an outer sleeve or ring 11 spaced therefrom between which there is a compressed elastic bushing 12 of rubber or similar material. For facilitating assembly of the bushing between the sleeves under compression, one inner edge of the sleeve 12 is slightly chamfered at 13 and one outer edge of the sleeve 10 is chamfered as indicated at 14.

The apparatus of this invention is shown in Figs. 3 to 6, inclusive, and comprises essentially a punch press mounted on a suitable bolster plate 15 with a sub base 16 and an outer fixture or a bed plate 17, all secured in fixed relation. There is provided a pilot means comprising a bed plate 17 having an inner annular piloting recess 18 for seating and centering therein the outer sleeve 11. Rotatably mounted within the bed plate 17 there is another pilot means comprising an oscillatory fixture 19 provided with an annular piloting recess 20. The recess 20 seats and centers the inner sleeve 10 therein so that it is held in juxtaposition to the outer ring 11 to provide the desired predetermined space between the adjacent concentric surfaces thereof for the reception of the bushing.

The oscillating fixture 19 is formed with a downwardly extending boss 21 mounted for oscillation upon and within the bed plate 17 by the bearing 22. Secured to the lower end of the boss 21 there is an oscillating arm 23 pivotally connected at 24 to a crank arm 25. The crank arm 25 (Fig. 6) is actuated at its free end by a rotating eccentric 26 driven through the shaft 27 by any suitable means not shown.

Upon the inner sleeve 10 being mounted in its seat on the oscillating fixture 19, it is clamped in position thereon by a clamping head 28. Said clamping head is secured to the fixture 19 by a bolt 29 and is provided with an annular piloting recess 30 conforming to the upper end of the sleeve 10 for seating and clamping said sleeve in position on the oscillating fixture. The outer annular face of the clamping head as indicated at 31, is of the same diameter as the chamfered end of the inner sleeve 10, and is adapted to receive thereabout the bushing 12 in its free state, as shown in Fig. 4.

The upper part of the press comprises the upper head 32 terminating in a ram 33 and connected with any suitable source of power for reciprocation in the usual manner. The head 32 carries a depending annular punch ring 35 of substantially the same thickness as the uncompressed bushing 12, and to extend in alignment with the spaced chamfered edges 13, 14 of the seated rings 10, 11.

The upper head 32 of the press carries an annular clamping ring 36 mounted adjacent to, surrounding and having reciprocation relative to the punch ring 35. Said clamping ring is secured to an annular series of guide pins 37, each having a head 38 and surrounded by a compression spring 39 seating in opposed pockets formed respectively in the upper head 32 and the clamping ring 36. Said pins are slidable in the upper head and the ring is so arranged as to seat upon and clamp the outer sleeve 11 on the bed plate 17.

In operation, and as shown in Fig. 4, the upper head of the press is raised, seating the sleeves 10 and 11 on the oscillating fixture and bed plate respectively, lubricating the bushing 12, or inner surfaces of the sleeves, and mounting it about the clamping head 28. As the press is lowered, the depending clamping ring 36 slides over the bushing into clamping engagement with the outer sleeve 11 to clamp it in position to provide an annular channel through which the punch ring 35 moves. Continued lowering of the upper head compresses the springs 39 and applies an axial force against the upper edge of the bushing, forcing it downwardly between the sleeves 10 and 11, as shown in Fig. 3. As the exerted force is applied to the bushing, the oscillating fixture is caused to oscillate by the means shown in Fig. 6, and such concurrent axial force and oscillation is continued until the bushing is finally positioned between the sleeves under compression.

The combined and simultaneous application of force and rotative movement of one of the sleeves relative to the other causes slippage between the bushing and the confining surfaces of the sleeves, which permits the bushing to settle into place under compression and relieves stresses in the material that would otherwise cause the sleeves to become eccentric in respect to each other with their surfaces out of parallel upon their being removed from the assembly fixture.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. Apparatus for assembling an annular elastic bushing in a compressed state between a pair of spaced annular and concentric sleeves, comprising a fixed bed plate for seating and centering the outer sleeve, an inner oscillating fixture rotatably mounted on said bed plate for seating and centering the inner sleeve in spaced relation to the outer sleeve, a clamping head secured to said fixture for clamping the inner sleeve thereon and adapted to receive the bushing thereabout for positioning said bushing in alignment with the space between said sleeves, a punch ring carrying a compressible clamping member thereon for engaging and clamping the outer ring on said bed plate, means for forcing said punch ring against one end of the bushing for forcing it axially into the space between said sleeves, and means for oscillating said fixture for effecting oscillation of one of said sleeves relative to the other sleeve simultaneously with the axial force applied to said bushing.

2. Apparatus for assembling an annular elastic bushing in a compressed state between a pair of spaced annular and concentric sleeves comprising an outer fixture for receiving and centering the outer sleeve, an inner fixture rotatably mounted relative to said outer fixture for receiving and centering the inner sleeve in spaced relation to the outer sleeve, a member fixed to and concentric with said inner fixture to receive the bushing thereabout for positioning it in alignment with the space between said sleeves, means including said member for clamping said inner sleeve to said inner fixture, a punch ring movable axially of said bushing in alignment therewith, means for clamping said outer sleeve to said outer fixture and for forcing said punch ring against the end of said bushing for forcing it axially into the space between said sleeves, and means for oscillating one of said fixtures relative to the other said fixture simultaneously with the axial force applied to said bushing.

3. Apparatus for assembling an elastic member in a compressed state between a pair of spaced concentric sleeves, comprising a support means for one of said sleeves for clamping and positioning said one sleeve, a second support means for the other of said sleeves for clamping and positioning the said other sleeve in concentric and spaced relation to said first sleeve, one of said support means being rotatably supported with respect to the other and including means for receiving said elastic bushing and positioning it in alignment with the space between said spaced sleeves, a punch engageable with said elastic member for forcing it between said spaced sleeves, and means for oscillating one of said support means relative to the other simultaneously with the application of pressure on said punch.

References Cited in the file of this patent

UNITED STATES PATENTS

| | | |
|---|---|---|
| 1,866,051 | McWane | July 5, 1932 |
| 1,959,254 | Zerk | May 15, 1934 |
| 2,263,815 | Northup | Nov. 25, 1941 |
| 2,303,689 | Graham | Dec. 1, 1942 |
| 2,551,652 | Vreeland | May 8, 1951 |
| 2,647,556 | Courtney | Aug. 4, 1953 |
| 2,684,524 | Beck | July 27, 1954 |